W. W. ANNABLE.
STEERING GEAR FOR AUTOMOBILES.
APPLICATION FILED SEPT. 8, 1914.

1,158,360. Patented Oct. 26, 1915.

WITNESSES:
Howard H. Garrington
Marie York

INVENTOR
Warren W. Annable
BY
Luther V. Moulton
ATTORNEYS.

UNITED STATES PATENT OFFICE.

WARREN W. ANNABLE, OF GRAND RAPIDS, MICHIGAN.

STEERING-GEAR FOR AUTOMOBILES.

1,158,360.   Specification of Letters Patent.   Patented Oct. 26, 1915.

Application filed September 8, 1914.   Serial No. 860,657.

*To all whom it may concern:*

Be it known that I, WARREN W. ANNABLE, a citizen of the United States of America, residing at Grand Rapids, in the county of Kent and State of Michigan, have invented certain new and useful Improvements in Steering-Gear for Automobiles; and I do hereby declare the following to be a full, clear, and exact description of the invention, such as will enable others skilled in the art to which it appertains to make and use the same.

My invention relates to improvements in steering gear for automobiles and like vehicles, and its object is to provide the same with certain new and useful features whereby the car may be more easily and safely guided, and the tendency of the same to leave the intended course automatically prevented.

Whenever a front wheel of a car having the usual steering gear strikes an obstruction at one side of the central plane of the wheel, the wheel tends to deviate from its proper course, thus the driver must be constantly on the alert and active in correcting this deviation, and failure to promptly do so often results in an accident.

My invention consists essentially of opposing springs mounted on the rod that connects and controls the steering wheels, and engaging a collar in which the rod is slidable, said spring exerting opposing pressures between the collar and the respective ends of the rod which pressures are balanced when the rod is in mid-position and the steering wheels adjusted to guide the car in a straight line and whenever the steering wheels are diverted toward either side of this line, the tension on one spring is increased and tension on the other spring is reduced whereby the first named spring automatically turns the wheels to correct position. This greatly reduces the effort necessary to guide the car and obviates the liability to accident due to deviation from the intended course.

Figure 1:
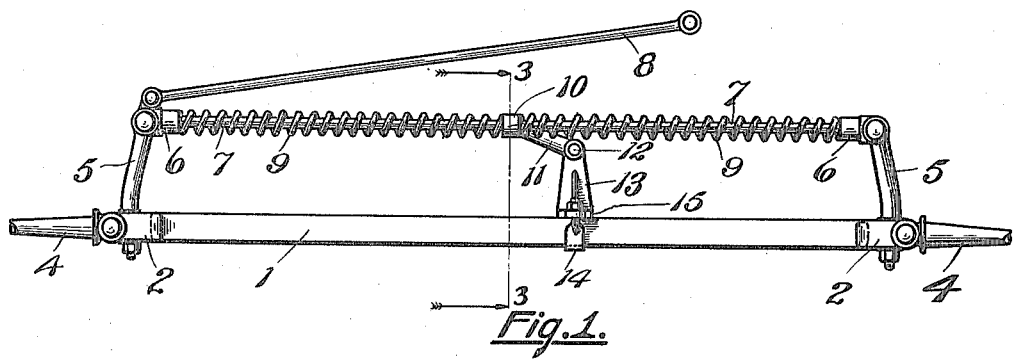
Figure 2:
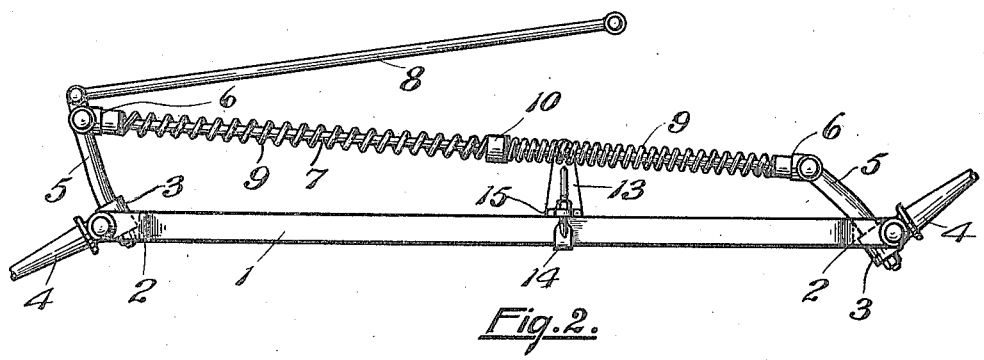
Figure 4:
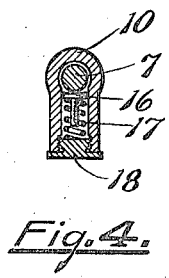
Figure 3:
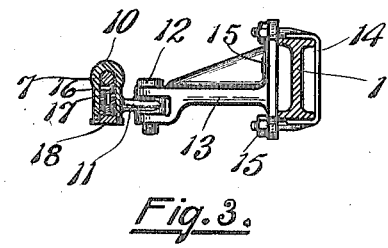

A preferred form of my invention is illustrated in the accompanying drawings in which:

Figure 1 is a plan view of a device embodying my invention adjusted with equal tension on each spring as in running a car in a right or straight line ahead. Fig. 2 the same adjusted as in turning a curve and with the springs held under unequal tension by the operator. Fig. 3 an enlarged transverse section on the line 3—3 of Fig. 1, and Fig. 4 an enlarged sectional detail on the same line as in Fig. 3.

Like numbers refer to like parts in all of the figures.

1 represents the forward axle of a car having a yoke 2 at each end in which is pivoted the head 3 of the respective stub axles 4 provided with steering arms 5, pivoted to the ends of which arms are the end yokes 6 of the coupling rod 7, and a steering rod 8, is provided to simultaneously adjust the stub axles to guide the car. So far the device is the usual construction found in automobiles and like cars.

My device as herein shown, consists of two equal compressible coiled springs 9, slidably mounted on the rod 7, and normally longer than the same whereby they are compressed when on the rod. The outer ends of these springs engage the yokes 6 on the respective ends of the rod, and at their inner ends oppositely engage a collar 10, slidably mounted on the rod and held at normal mid-distance on the same by an arm 11, extending substantially parallel with the rod and carrying the collar 10 at one end and pivoted at the other end 12 to a rigid arm 13 projecting from the front axle, and adjustably secured thereto by a clip 14, embracing the axle and extending through a flange 15, on the end of the arm 13. The arm 11, swings on the pivot 12, toward and away from the axle in a short arc and the rod slides freely in the collar thus permitting free normal movement of the steering device. The arms 5, alternately approach and recede from the collar 10. The springs are thus equally compressed only when the device is adjusted as shown in Fig. 1 for guiding the car in a straight line.

To prevent vibration of the rod in the collar and to reduce the sensitiveness of the device to shocks due to obstructions encountered by the wheels, I provide a friction brake mounted in a housing projecting from the collar 10, which brake consists of a friction member 16, yieldably forced against the rod by a compressed spring 17 resting on a removable plug 18, in the bottom of the housing.

From the foregoing description the operation of my device will be readily understood.

By adjusting the stub axles in alinement and slackening the clip 14, the device will readily adjust with the springs 9 under equal opposing tension. The clip is then tightened and any tendency of the car to turn out of a straight forward direction is quickly corrected by the springs as heretofore described. By operating the steering wheel when turning the car in a curve a constant difference of stress on the springs is maintained by the operator.

The principal function of the friction brake is to prevent longitudinal vibration of the steering rod, due to any roughness of the surface of the road. I am aware that anti-rattlers are used to prevent lateral vibration of rods, but I do not claim such devices.

What I claim is:—

1. In combination with steering gear for a car having a longitudinally and laterally movable rod to control the steering wheels of the car, two opposing springs connected to the respective ends of the rod at their outer ends, a collar oppositely engaged by the springs at their inner ends and slidable on the rod, and means for holding the collar from moving with the longitudinal movement of the rod and permitting the collar to move with the lateral movement of the rod.

2. In combination with steering gear for a car having a rod connected at its respective ends to arms projecting rigidly from pivoted stub-axles, opposing compressible coiled springs slidable on the rod and connected to the respective ends of the same at their outer ends, a collar slidable on the middle of the rod and oppositely engaged by the inner ends of the springs, an arm extending substantially parallel with the rod, said arm being pivoted at one end and connected to the collar at the other end.

3. Steering gear for a car comprising pivoted stub-axles for the steering wheels, arms projecting rigidly from said axles, a rod connecting the ends of the arms, opposing coiled springs surrounding the rod and slidable thereon, the outer ends of the springs being connected to the respective ends of the rod, a collar slidable on the rod near the middle thereof and oppositely engaged by the springs, an arm arranged substantially parallel with the rod connected with the collar at one end, and an adjustable arm to which the first named arm is pivoted at the other end.

4. Steering gear for a car comprising an axle provided with a pivoted stub-axle at each end, rigid arms extending from the stub-axles, a rod connecting the ends of said arms, opposing coiled springs surrounding the rod and slidable thereon, said springs engaging yokes on the respective ends of the rod at their outer ends, a collar slidable on the middle of the rod and oppositely engaged by the springs, an arm connected to the collar at one end and extending substantially parallel with the rod, a rigid arm adjustably mounted on the axle and pivotally supporting the arm which is connected to the collar.

5. Steering gear for a car comprising pivoted stub-axles each having a rigid arm, a longitudinally movable rod connecting said arms, a collar slidable on the rod, springs on the rod oppositely engaging the collar, means for holding the collar from moving with the longitudinal movement of the rod, and to permit the collar to move with the lateral movement of the rod and a brake in the collar frictionally engaging the rod to prevent longitudinal vibration of the same.

In testimony whereof I affix my signature in presence of two witnesses.

WARREN W. ANNABLE.

Witnesses:
LUTHER V. MOULTON,
H. H. YARRINGTON.

Copies of this patent may be obtained for five cents each, by addressing the "Commissioner of Patents, Washington, D. C."